United States Patent
Pfeffer

(10) Patent No.: US 11,433,784 B2
(45) Date of Patent: Sep. 6, 2022

(54) SEAT ADJUSTMENT SYSTEM FOR A SEAT OF A MOTOR VEHICLE, AND MOTOR VEHICLE

(71) Applicant: AUDI AG, Ingolstadt (DE)

(72) Inventor: Frank Pfeffer, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 451 days.

(21) Appl. No.: 16/627,838

(22) PCT Filed: Jun. 14, 2018

(86) PCT No.: PCT/EP2018/065815
§ 371 (c)(1),
(2) Date: Dec. 31, 2019

(87) PCT Pub. No.: WO2019/007658
PCT Pub. Date: Jan. 10, 2019

(65) Prior Publication Data
US 2020/0122608 A1    Apr. 23, 2020

(30) Foreign Application Priority Data

Jul. 1, 2017 (DE) .......................... 102017006241.2

(51) Int. Cl.
*B60N 2/02* (2006.01)
*B60N 2/20* (2006.01)

(52) U.S. Cl.
CPC ......... *B60N 2/0276* (2013.01); *B60N 2/0232* (2013.01); *B60N 2/20* (2013.01)

(58) Field of Classification Search
CPC ...... B60N 2/0276; B60N 2/0232; B60N 2/20; B60N 2/0244
See application file for complete search history.

(56) References Cited

U.S. PATENT DOCUMENTS 4,660,140 A * 4/1987 Illg .................... G05B 19/0425
                                                    714/E11.003
5,285,139 A * 2/1994 Ogasawara .......... B60N 2/0244
                                                           318/56

(Continued)

FOREIGN PATENT DOCUMENTS

CN         102019860 A      4/2011
CN         102343874 A      2/2012

(Continued)

OTHER PUBLICATIONS

Chinese Office Action dated Jul. 23, 2021, in connection with corresponding CN Application No. 201880044179.7 (14 pp., including machine-generated English translation).

(Continued)

*Primary Examiner* — Philip F Gabler
(74) *Attorney, Agent, or Firm* — Maier & Maier, PLLC

(57) ABSTRACT

A seat adjustment system for a seat of a motor vehicle, including at least one motor driving the adjustment and at least one operating element, which can be actuated by an operator, for at least one adjustment function, and the actuation of which closes a switch provided in a line from the motor associated with the adjustment function to a power supply, wherein a relay is provided downstream of the switch to the motor in the line, said relay being open in the non-energized state, and the seat adjustment system has a control unit which is designed to close the relay when an operating element is actuated and there is no collision signal indicating a collision of the motor vehicle and leaves the relay open at least temporarily if there is a collision signal when an operating element is actuated.

7 Claims, 1 Drawing Sheet

(56) References Cited

U.S. PATENT DOCUMENTS

| | | | | |
|---|---|---|---|---|
| 5,903,122 | A | * | 5/1999 | Mesnage .............. B60N 2/0248 318/469 |
| 6,326,704 | B1 | * | 12/2001 | Breed .................. G07C 5/0808 340/12.32 |
| 7,031,814 | B2 | * | 4/2006 | Kawato ................ B60R 21/013 280/735 |
| 10,518,674 | B1 | * | 12/2019 | Aikin ...................... B60N 2/14 |
| 2018/0022235 | A1 | * | 1/2018 | Sugiyama ............ B60N 2/0244 297/284.9 |
| 2019/0152348 | A1 | * | 5/2019 | Ishida .................. B60N 2/0244 |
| 2020/0122608 | A1 | * | 4/2020 | Pfeffer ..................... B60N 2/20 |

FOREIGN PATENT DOCUMENTS

| | | |
|---|---|---|
| DE | 3933562 A1 | 4/1991 |
| DE | 102006030729 A1 | 1/2008 |
| DE | 102011050151 A1 | 11/2012 |
| JP | S58-49529 A | 3/1983 |
| JP | S62-286851 A | 12/1987 |
| JP | H03-193536 A | 8/1991 |
| JP | H06-15313 B2 | 3/1994 |
| JP | H0615313 B2 | 3/1994 |

OTHER PUBLICATIONS

German Examination Report dated Apr. 24, 2018 in corresponding German Application No. 102017006241.2; 8 pages; Machine translation attached.

International Search Report dated Sep. 20, 2018 and Written Opinion in corresponding International Application No. PCT/EP2018/065815 17 pages; Machine translation attached.

International Preliminary Report on Patentability (Chapter 1) dated Jan. 16, 2020, in corresponding International application No. PCT/EP2018/065815; 7 pages.

Office Action dated Feb. 24, 2021 in corresponding Japanese Application No. 2019-571519; 10 pages including English-language translation.

Korean Office Action dated Feb. 22, 2021, in connection with corresponding KR Application No. 10-2020-7002581 (6 pp., including machine-generated English translation).

* cited by examiner

SEAT ADJUSTMENT SYSTEM FOR A SEAT OF A MOTOR VEHICLE, AND MOTOR VEHICLE

FIELD

The disclosure relates to a seat adjustment system for a seat of a motor vehicle, including at least one motor driving the adjustment and at least one operating element, which can be actuated by an operator, for at least one adjustment function, and the actuation of which closes a switch provided in a line from the motor associated with the adjustment function to a power supply. The disclosure also relates to a motor vehicle.

BACKGROUND

Seats in motor vehicles have to be brought into a position for drivers and other occupants which increases comfort and/or safety. Therefore, such seats for motor vehicles usually have a plurality of adjustment possibilities, for example with respect to the longitudinal position of the seat in relation to the longitudinal direction of the vehicle, the height of the seat, the pivot position of a seat backrest and/or the tilting of the seat surface. Whereas such adjustments in the past were made entirely manually, i.e. mechanically by a person sitting on the seat, current motor vehicles offer more convenient solutions in which motors are used to provide the various adjustment functions without the occupant sitting on the seat applying force. The adjustment functions are then associated with operating elements which can be provided, for example, in the region of an armrest of the corresponding seat or the like.

There are two basic different options for specifically implementing seat adjustment systems of this kind. One option utilizes operating elements which act directly in a load-switching manner by means of a corresponding mechanical coupling to a switch so that actuation of the operating element consequently leads to direct connection of voltage/current to the motor of the seat adjustment system. Since occupants usually also have a certain weight, higher currents, up to 30 A, are usually required, so the corresponding components are power electronics components.

Alternatively, however, operating elements are also proposed which supply a control current so that the actuation of the operating element, for example in a resistance-coded manner, can be transmitted to a seat control device of the seat adjustment system. For example, the operating elements can be connected to analog/digital inputs of a microchip and then supply switching currents in the mA range.

With regard to the operating elements for the seat adjustment system, there is often the problem that they are mounted in regions in which the operating element can be unintentionally actuated in the event of a motor vehicle accident that involves changes in the shape of the body and/or other components of the motor vehicle, in particular in the event of a collision (crash) with an object. This in turn can lead to unintended effects in certain adjustment functions, for example the longitudinal adjustment and/or the tilting of the backrest, for example in that an occupant on the seat is pressed into the airbag and/or another component of the motor vehicle, in addition to the consequences of the accident.

Therefore, it has already been proposed in the prior art to use a seat control device which can read switching signals of the operating elements, which in this case do not act directly in a load-switching manner, and read a collision signal indicating a present collision situation via a bus system of the motor vehicle and, in the event of a collision signal indicating a collision, inhibit actuation of the motors of the seat adjustment system. However, this embodiment has the disadvantage that an expensive smart seat control device is required, which can only be produced at great cost. Furthermore, unwanted delays can occur when using the bus system of the motor vehicle.

Other proposed solutions use, for example, pyrotechnic measures to make the switches no longer operable in the event of a collision and/or to interrupt a line from a power supply to a motor driving the adjustment. These measures have the considerable disadvantage that rescue workers often want to reenable adjustment of a seat to reach a potentially trapped occupant. Furthermore, the seat adjustment system would have to be completely repaired after any collision.

SUMMARY

The disclosure therefore addresses the problem of providing a reliable, low-cost and reversible possibility for avoiding unintentional seat adjustment during a motor vehicle collision.

In order to solve this problem, in a seat adjustment system of the aforementioned type according to the invention, a relay is provided downstream of the switch to the motor in the line, said relay being open in the non-energized state, and the seat adjustment system has a control unit which is designed to close the relay when an operating element is actuated and there is no collision signal indicating a collision of the motor vehicle and leaves the relay open at least temporarily if there is a collision signal when an operating element is actuated.

In this case, it is particularly preferred if the operating element is mechanically coupled to the load-switching switches and a closing of the switches by means of a closing circuit generates a closing signal to the control unit or can be detected by the control unit by means of the closing circuit. In the context of the present invention, it is thus possible to simply dispense with a seat control device and to use an easily configurable microchip that receives the position of the load-switching switches, which are actuated mechanically and directly by the manually actuated operating element, receives the collision signal as input data and decides accordingly whether or not the relay is to be closed. A relay that is open in the non-energized state (normally open) is used as a relay so that targeted actuation of the relay for interrupting the line in the event of a collision is avoided, which would be necessary in the case of a normally closed relay.

According to the invention, the relay is arranged downstream of the preferably load-switching switches to the motor, which has the advantage that the position of the switches can continue to be easily monitored via the microchip, which can be expedient for rescue workers in particular with respect to potential resetting. Since the relay is configured with an open connection, unless it is energized, operability and safety are also ensured in the case of undervoltage.

If, in an alternative embodiment not according to the invention, the relay were connected on the power supply side upstream of the load-switching switches to be monitored, it would be necessary, for monitoring the switch position, to periodically close the relay to enable a current flow and thus even monitoring. Owing to the fact that, according to the invention, the relay is connected downstream of the switches, the switch positions of the load-switching switches mechanically actuated by means of the operating elements can be easily monitored without current necessarily being supplied to the motor for this monitoring of the switches.

As already mentioned, the control unit, in particular in the case of load-switching switches which are directly mechanically actuated by means of the operating elements, can be a microchip and can thus be designed in a particularly simple manner. It is further preferable if the collision signal is received as a PWM signal. In this way, particularly in the case of direct transmission, delays by the bus system of the motor vehicle can be avoided; it should be noted again that it is solely by virtue of the fact that a control device is not required to convert switch signals of direct influence on the operating elements which have switches that operation can be instantaneous. Such a PWM signal can be supplied, for example, by an airbag control device and/or the control device of a safety system which evaluates the signals from collision sensors.

In a particularly advantageous embodiment, it is possible for the control unit to be designed to close the relay in the event of a switch actuation following a second switch actuation after there is a collision signal. As already mentioned, it is desirable to allow rescue workers to fully utilize the adjustment function again after a collision. In order to make this possible, according to the particularly advantageous embodiment of the invention proposed here, the switch actuation is initially completely blocked after there is or has been a collision signal so that deformation, for example of body parts, cannot cause inadvertent seat adjustment during the collision process. If an operating element has not been inadvertently actuated by a deformation, rescue workers are not deterred from actuating the operating element twice consecutively, so rescue workers can easily restore operation. If the operating element is inadvertently actuated by the collision, the adjustment function blocked during the collision can be used again even immediately after the collision to provide assistance. In this embodiment, the invention advantageously makes use of the fact that the switches can be easily monitored by the control unit without supplying current to the motors on account of the downstream arrangement of the relay, in particular without the relay first having to be actuated. Consequently, the adjustment function can be enabled again after deactivation by a collision signal during the second actuation of the operating element by means of an easily implemented counter within the control unit. Thus, a significantly more advantageous design is provided than a deactivation for a predetermined period of time since it is not possible to predict when the situation in which inadvertent actuation of the operating element caused by deformation has ended, so an occupant who has not yet been freed from the motor vehicle could be adversely affected by too early a reactivation.

According to a further particularly advantageous embodiment of the present invention, the control unit is designed to open the relay when an operating element is actuated and/or a switch is closed for longer than a predetermined period of time. Switch monitoring, which is possible independently of the actual switching state of the relay, therefore makes it possible to also determine "stuck" operating elements, for example buttons, so as to prevent current/voltage supply to the motor in such an event. No quiescent current is then required, the switches are not damaged and the motors are not impaired by block current. In this case, the predetermined period of time can be chosen advantageously to be longer than the maximum duration of a maximum adjustment path of an adjustment function. In this way, it is ensured that the motor is not deactivated too early during maximum adjustment.

In this context, it is further advantageous if, in the event of a relay opened due to an exceeded predetermined period of time, the control unit cyclically checks whether the switch has been opened and/or the operating element actuation has ceased, after which the relay is closed again when the operating element is again actuated and there is no collision signal. In this way, it can also be detected if "sticking" of the switch/operating element has ceased so that actuation is again possible as usual.

In a preferred development, the adjustment functions can comprise a backrest tilting function and a longitudinal adjustment function, wherein a relay is associated only with the motors associated with said adjustment functions. It has been found that the adjustment of the seat in the longitudinal direction of the motor vehicle (longitudinal adjustment function) and the tilting of a backrest of the seat of the motor vehicle (backrest tilting function) constitute the critical functions which can further adversely affect an occupant after a collision. Other adjustment functions, such as, for example, a height adjustment of the seat and/or a tilting of the seat surface of the seat are usually not critical, so the effort of providing a corresponding crash safety mechanism can be avoided in the present case. In this way, effort is spared in that an additional relay for safety in the event of a collision is associated only with the adjustment functions for which this is necessary. Of course, embodiments are also conceivable within the scope of the invention in which one or three in the form of more or generally different adjustment functions can be deactivated in the event of a crash in this manner.

In addition to the seat adjustment system, the present invention also relates to a motor vehicle having a seat and a seat adjustment system of the type according to the invention associated therewith. All the embodiments with respect to the seat adjustment system according to the invention can be conferred analogously to the motor vehicle according to the invention, with which the already mentioned advantages can also be obtained.

A method for operating a seat adjustment system of the type according to the invention is also conceivable, wherein the relay is closed by means of the control unit when an operating element is actuated and there is no collision signal indicating a collision of the motor vehicle, and the relay is left open at least temporarily, preferably up to a second actuation of the operating element after the collision signal has ceased when an operating element is actuated and there is a collision signal. The previous embodiments, naturally, also apply to the method.

It should also be noted that, according to an embodiment not according to the invention, when a control device is used which reads switching signals from operating elements not directly actuating the load-switching switches and, on the basis thereof and of the collision signal, controls the adjustment function, the switches can be designed as a double relay, wherein an additional switch associated with the operating element can also be used which is opened when there is a collision signal. This means that, in the case of an embodiment comprising a control device and operating elements which are not directly mechanically load-switching, a motor is prevented from being used in the event of a collision by the fact that operating inputs of the operating elements are no longer accepted. However, this has the disadvantage that a double relay is required, there is a delay in motor actuation and it is no longer possible to provide a release option for stuck relays and reactivation for rescue workers.

BRIEF DESCRIPTION OF THE DRAWING

Further advantages and details of the present invention arise from the exemplary embodiments described below and on the basis of the drawings. The following is shown.

DETAILED DESCRIPTION

Figure 1:
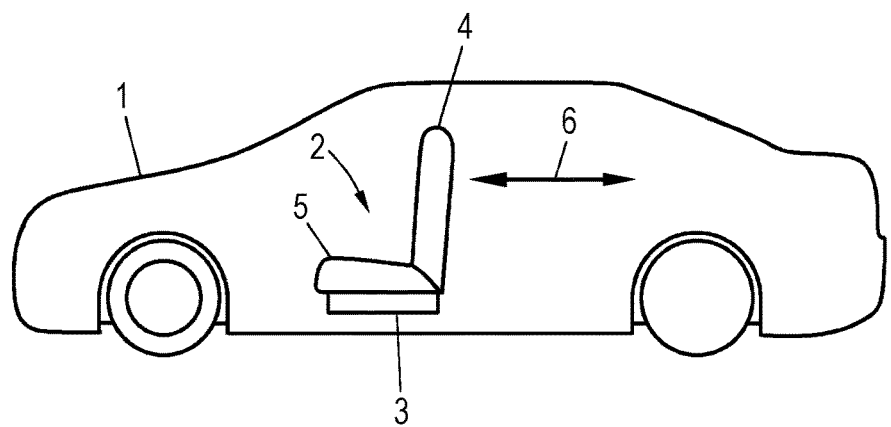
FIG. 1 shows a schematic diagram of a motor vehicle according to the invention.

FIG. 1 shows a schematic diagram of a motor vehicle 1 according to the invention. Said motor vehicle has at least one seat 2 with which a seat adjustment system 3 according to the invention is associated, which is explained in more detail below in relation to FIG. 2. The seat 2 comprises a backrest 4 and a seat surface 5, wherein in the present case a sliding of the seat in the longitudinal direction 5 of the motor vehicle 1, a raising/lowering of the seat surface 5, a tilting of the seat surface 5 and a pivoting of the backrest 4 are provided as adjustment functions of the seat adjustment system.

Figure 2:
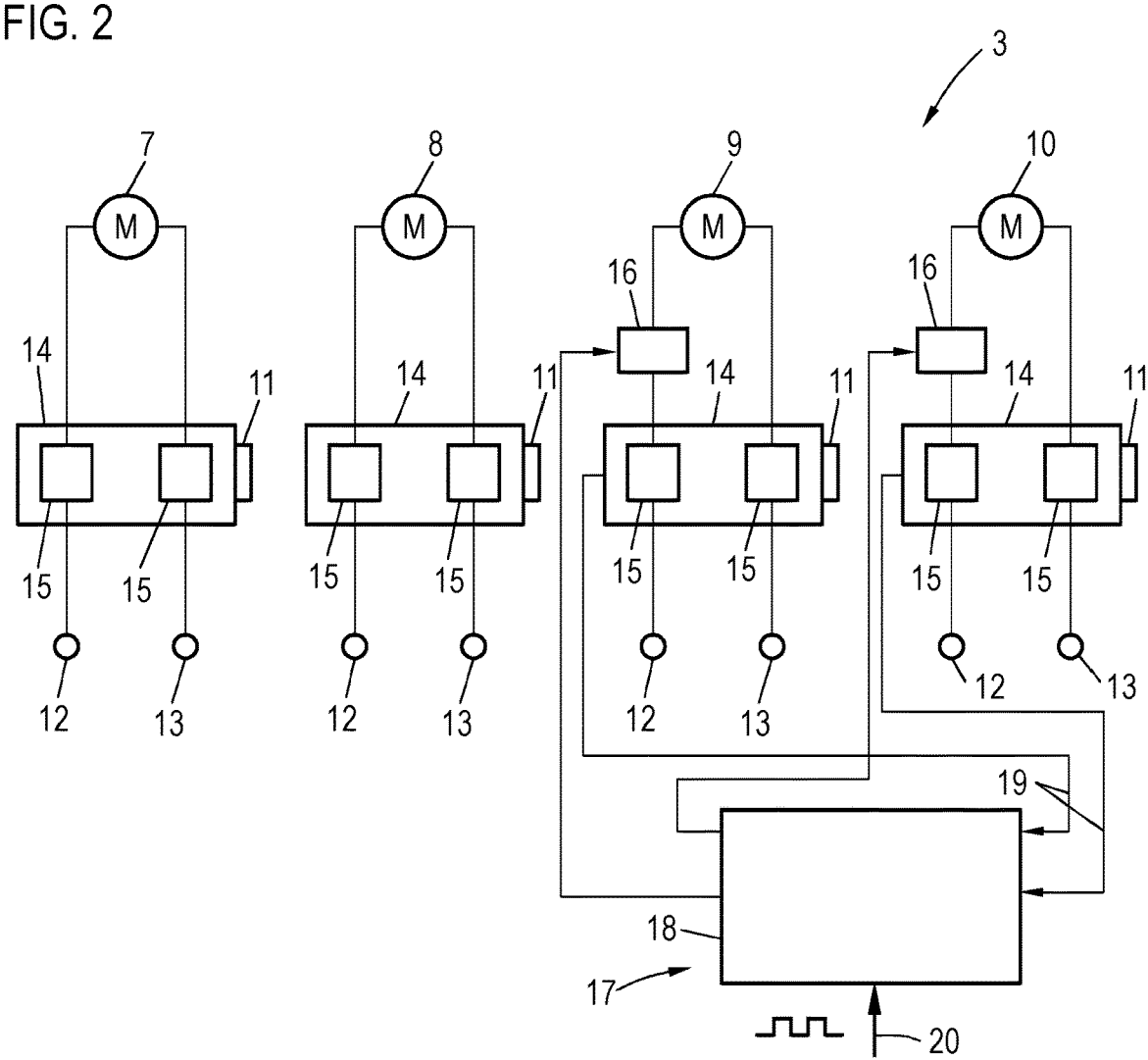
FIG. 2 shows a seat adjustment system according to the invention.

FIG. 2 shows the structure of the seat adjustment system 3 in more detail in the form of an abstracted representation. Said seat adjustment system first comprises motors 7, 8, 9, 10 for implementing the adjustment functions. The motor 7 is used for adjusting the tilting of the seat surface, the motor 8 is used for adjusting the height of the seat surface, the motor 9 is used for longitudinal adjustment of the seat 2 and the motor 10 is used for tilting the backrest 4. The motors 7 to 10 are basically controlled by the operator via operating elements 11, which have two actuating positions so that a motor can be actuated in both directions. In order to connect the motors 7 to 10 to the power supply when a corresponding operating element 11 is actuated, provided in this case by a terminal 30 connection 12 and a terminal 31 connection 13, a switching system 14 coupled mechanically to each of the operating elements 11 has two switches 15 which, depending on the actuating direction of the operating element 11, connect the motor lines shown to one of the terminals 12, 13.

The mechanical operating system formed by the operating element 11 and the switching system 14 is thus directly load-switching.

For the adjustment functions not to be actuated by deformation of the motor vehicle 1 in the event of a collision, there are special characteristics for the longitudinal adjustment of the seat 2, the pivoting of the backrest 4, and motors 9 and 10. A normally open relay 16 is connected in one of the lines to the motors 9, 10, and therefore has to be supplied with current in order to be able to provide a connection between the switching system 14 and the motor 9. The relays 16 can be controlled via a control unit 17, designed in the present case as a microchip 18, in order to allow current flow and thus operation of the motors 9, 10. For this purpose, the control unit 17 monitors whether the operating elements 11 for the motors 9, 10 have been actuated, for which, for example, a branching signal line with a high resistance can be placed in a closing circuit downstream of the switches which are then also actuated. It should be noted here that actuation of the switches 15 can also be determined by connecting the relay 16 downstream if the relay 16 is in an open state, and thus the motor 9, 10 is not operated at all.

The closing signals indicating actuation of the operating element 11 and thus of the switches 15 are therefore supplied to the control unit 17 via control lines 19. Said control unit further receives, via a further input, a pulse-width-modulated collision signal according to the arrow 20 if there is a collision of the motor vehicle 1. If there is no collision signal, the control unit 17 closes the corresponding relay 16 by supplying current when the corresponding operating element 11 is actuated so that the corresponding adjustment function is carried out by operation of the corresponding motor 9, 10.

If, however, there is or has been a collision signal, the corresponding relay 16 is not supplied with current for the next actuation of an operating element 11, so when an operating element is actuated, for example, by deformation during a collision, the adjustment function is not carried out and an occupant on the seat 2 is protected.

However, in the case of the second actuation of an operating element 11 after a collision signal indicating a collision ceases, the control unit 17 is also designed to operate the function again as normal and thus to supply the corresponding relay 16 with current and to enable the adjustment function. This means that the adjustment functions via the motors 9, 10 are blocked precisely for an adjustment process so that rescue workers after a collision (or even the occupant him/herself after the collision) is able to use the adjustment function again, for example to extricate him/herself from the motor vehicle 1, to facilitate accessibility and/or, if the collision has not been serious, to be able to use the adjustment functions again simply as intended.

Finally, the control unit 17 has a further function, specifically the detection of stuck or jammed switches 15 or operating elements 11. If it is found that the switches 15 remain closed beyond a predetermined period of time, an undesired defect is inferred and the current supply to the relay 16 is discontinued to protect the motor 9 and the switches 15. Nevertheless, it is further monitored by means of the control lines 19 and the corresponding switching signals as to whether actuation ceases. As soon as actuation ceases, it is assumed that the stuck/jammed state has been resolved, and operation is continued again as normal by restoring availability of the adjustment function. The predetermined period of time is otherwise selected in such a way that it exceeds a maximum adjustment distance of an adjustment function.

It should also be noted that the collision signal can be supplied as a PWM signal, for example, via a special line directly from an airbag control device and/or a control device of a safety system.

The invention claimed is:

1. A seat adjustment system for a seat of a motor vehicle, comprising:
   at least one motor for driving an adjustment function of the seat;
   at least one operating element, which can be actuated by an operator to execute the adjustment function;
   a switch provided in a line between the at least one motor associated with the adjustment function and a power supply, the switch being closed when the at least one operating element is actuated;
   a relay provided in the line to the at least one motor and downstream of the switch, said relay being open in a non-energized state; and
   a control unit;
   wherein the control unit is designed to close the relay when the at least one operating element is actuated in an absence of a collision signal indicating a collision of the motor vehicle and the control unit is designed to leave the relay open at least temporarily when the at least one operating element is actuated in a presence of the collision signal;

wherein the switch is a load-switching switch;

wherein the at least one operating element is mechanically coupled to the switch; and wherein a closing of the switch generates a closing signal which is transmitted to the control unit by a closing circuit or the closing of the switch is detectable by the control unit via the closing circuit.

2. The seat adjustment system according to claim 1, wherein the control unit is a microchip and/or the collision signal is received as a PWM signal.

3. The seat adjustment system according to claim 1, wherein the control unit is designed to close the relay upon a second occurrence of a switch actuation after the presence of the collision signal.

4. The seat adjustment system according to claim 1, wherein the control unit is designed to open the relay when the at least one operating element is actuated and/or the switches is closed for longer than a predetermined period of time.

5. The seat adjustment system according to claim 4, wherein the predetermined period of time is selected to be longer than a maximum duration of a maximum adjustment path of the adjustment function.

6. The seat adjustment system according to claim 4, wherein, when the relay is open because the predetermined period of time has been exceeded, the control unit cyclically checks whether the switch has been opened and/or the at least one operating element has ceased to be actuated, after which the relay is closed again when the at least one operating element is actuated again and there is no collision signal.

7. The seat adjustment system according to claim 1, wherein:

the adjustment function is one or more of a backrest tilting function and a longitudinal adjustment function; and wherein the relay is associated only with those of the at least one motor associated with said adjustment function.

* * * * *